United States Patent Office 3,188,893
Patented June 15, 1965

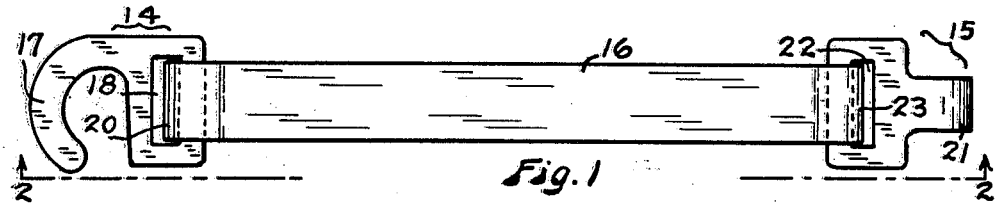
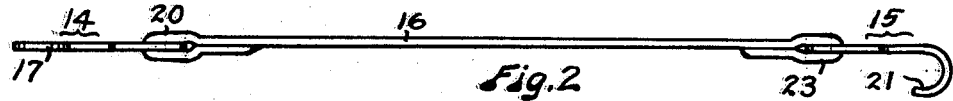
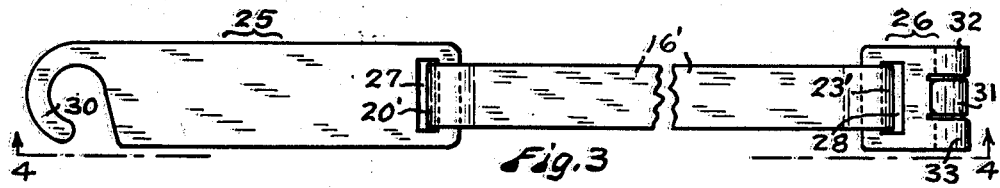
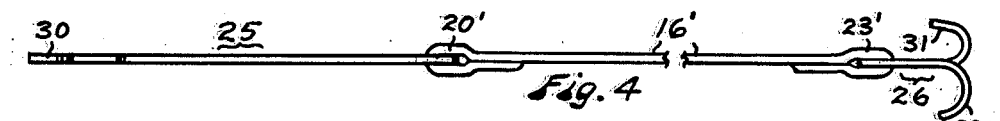
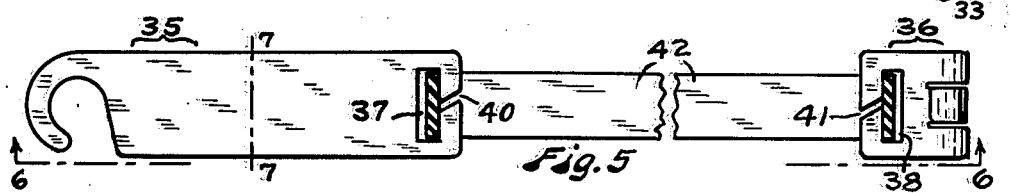
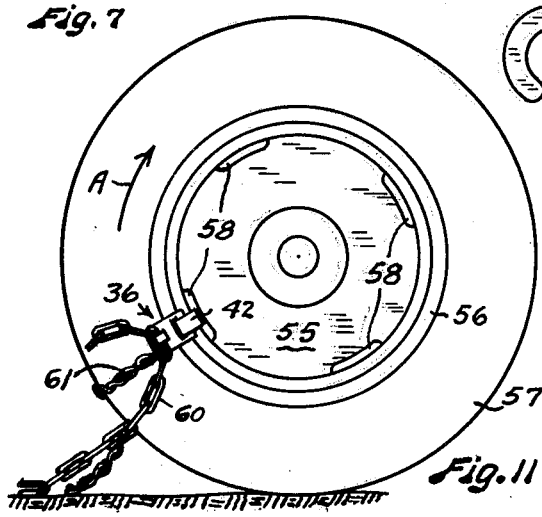
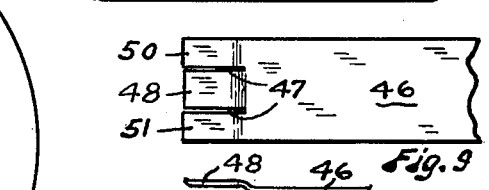
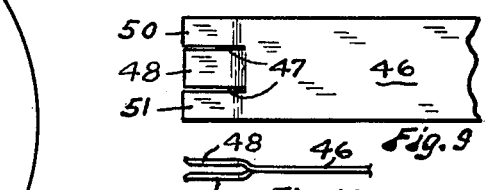

3,188,893
TIRE CHAIN APPLYING DEVICES
John E. Webb, 4747 46th Ave. SW., and Elmer M. Scott, 7061 7th Ave. NW., both of Seattle, Wash.
Filed May 27, 1963, Ser. No. 283,201
3 Claims. (Cl. 81—15.8)

Our invention relates to a tire chain applying device of a type useful in facilitating the application of tire chains to the tires of motor vehicles.

The use of anti-skid chains, herein termed tire chains, is often necessary to make possible and safe the operation of motor vehicles under adverse road conditions and in many instances their use is mandatory.

In applying tire chains to the tires of motor vehicles it is ordinarily necessary to jack up each wheel to which a tire chain is to be applied, then pass the tire chain around the tire, often under fenders which are close to the tire and may be coated with mud and ice, and then connect the two ends of the tire chain together with the chain fitting closely enough around the tire so that it will not come off and will not contact the fender or other vehicle parts which are close to the tire. It is frequently necessary to put on tire chains under adverse conditions with the vehicle resting on wet or muddy or frozen ground or on a roadbed which is covered with snow, ice, mud or slush. For these reasons the application of tire chains to tires is ordinarily a difficult, unpleasant and time consuming task.

It is an object of our invention to provide a simple and efficient tire chain applying device by which one end portion of a conventional tire chain can quickly and easily be attached to a vehicle wheel and drawn snugly against a tire and held in engagement with the tire in such a manner that when the wheel is rotated, for instance by longitudinally moving the vehicle it is part of, the tire chain will be drawn around the tire and caused to encircle the tire so that the two end portions of the tire chain will approximately meet and may easily be secured together thereby saving time and labor in the application of the tire chain.

Another object of our invention is to provide a tire chain applying device comprising a fairly strong thin flat elastic connector member having two hook members attached to opposite ends thereof, one of said hook members being thin and flat whereby it can be passed through a narrow opening in the web or rim portion of a wheel rim in securing the tire chain applying device to the wheel and the other hook member preferably having a tire chain engaging hook extending transversely therefrom in one direction and having one or more finger hold members extending transversely therefrom in an opposite direction so that said last mentioned hook member can be conveniently and firmly grasped in withdrawing the tire chain applying device from a wheel.

Another object of our invention is to provide a tire chain applying device of the type described in the preceding paragraph in which the thin flat hook member is relatively long and made of rigid material so that it can be pushed through narrow openings in the web or rim portions of dual wheels in applying tire chains to the tires of such wheels.

Another object is to provide a tire chain applying device comprising two hook members formed of strong, thin, flat material connected with each other by an endless band of thin flat elastic material, each of said hook members having, in its inner end portion, a transverse slot through which the elastic band normally extends and further having therein an access slot of narrow width extending between the transverse slot and a marginal edge of the hook member whereby the endless elastic band can be passed through the narrow acecss slot into and out of the transverse slot in engaging the elastic band with and disengaging it from the hook member.

Other objects of our invention will be apparent from the following description taken in connection with the accompanying drawings.

In the drawings FIGURE 1 is a plan view showing a flat side of a tire chain applying device constructed in accordance with our invention.

FIG. 2 is an edge view of the same looking in the direction of broken line 2—2 of FIG. 1.

FIG. 3 is a plan view showing a flat side of one of our tire chain applying devices of modified form.

FIG. 4 is an edge view looking in the direction of broken line 4—4 of FIG. 3.

FIG. 5 is a plan view showing a flat side of another tire chain applying device of modified form.

FIG. 6 is an edge view looking in the direction of broken line 6—6 of FIG. 5.

FIG. 7 is a cross sectional view taken on broken line 7—7 of FIG. 5.

FIG. 8 is a plan view showing the flat side of still another modified form of our invention.

FIG. 9 is a fragmentary plan view showing one end portion of a tool which can be used to facilitate pushing hook members of our tire chain applying device through narrow and restricted and difficult to reach openings in the rim portions of wheels.

FIG. 10 is a fragmentary edge view of the tool shown in FIG. 9.

FIG. 11 is a somewhat schematic side elevational view illustrating one manner of using our tire chain applying device in applying a tire chain to a tire on a wheel.

Like reference numerals refer to like parts throughout the several views.

The embodiment of our tire chain applying device disclosed in FIGS. 1 and 2 is well adapted for use in applying tire chains to the wheels of ordinary automobiles. It comprises two hook members, indicated generally by numerals 14 and 15, connected with each other by a thin, flat connector member 16 which preferably is formed of fairly strong rubber and is elastic. Preferably the hook members 14 and 15 are formed of thin flat rust proof metal. The outer end portion of the hook member 14 is suitably shaped to form a hook 17 and the inner end portion of said member 14 is provided with a transverse slot 18 through which a looped end portion 20 of the elastic connector member 16 extends. The hook member 14 can conveniently be formed by stamping and all of its parts lie in approximately a common plane so it can be inserted through narrow openings in the web and rim portions of wheels.

The hook member 15 terminates at its outer end in a transversely extending hook element 21 of narrower width than the other parts of said member 15 to be engaged by a tire chain and the inner end portion of said hook member 15 is provided with a transverse slot 22 to receive a looped end portion 23 of the elastic connector member 16. Preferably the looped end portions 20 and 23 of the elastic connector member 16 are secured to the hook members 14 and 15 by passing them through the respective slots 18 and 22 and doubling them back and vulcanizing them to said connector member 16. The hook 21 not only serves as a part with which a tire chain may be connected but further facilitates grasping the hook member 15 in the hand and withdrawing the device from a wheel.

The embodiment of our invention disclosed in FIGS. 3 and 4 comprises two hook members 25 and 26 connected with the respective end portions of an elastic connector member 16', which can be similar in all ways to the connector 16 and has looped end portions 20' and 23' engaged within transverse slots 27 and 28 respectively in the inner end portions of the hook members 25 and 26. The hook member 25 is thin and flat and of substantial length and terminates at its outer end in a hook 30 which lies in substantially the same plane as the other parts of said hook member 25. For application to some wheels and particularly wheels of the dual type, commonly used on trucks, it is desirable to have the hook member 25 of substantial length. This length can be varied, for instance, from a length of about four inches for truck wheels of smaller size to about seven inches for those of larger size. The hook member 26 terminates in a medially positioned, transversely extending, hook 31 and two laterally positioned transversely extending finger pieces 32 and 33, which are also of hook shape and which protrude in an opposite direction from the medially positioned hook 36. By bending the hook 31 of the membre 26 in one direction and the finger pieces 32 and 33 in the opposite direction we provide a part which is easier and more convenient to grasp and hold in withdrawing the chain applying device from a wheel than is the hook member 15 shown in FIGS. 1 and 2.

FIGS. 5 and 6 disclose an embodiment of our invention comprising two hook members 35 and 36 having, in their inner end portions, transverse connector member receiving slots 37 and 38 which are respectively intersected by narrow access slots 40 and 41 formed in the material bordering the transverse slots 37 and 38. The narrow access slots 40 and 41 extend from the respective slots 37 and 38 to the exteriors of the hook members 35 and 36 and preferably are located about mid way of the width of said hook members and extend obliquely through the slot bordering material at the innermost ends of the hook members 35 and 36. Said hook members 35 and 36 are connected with each other by an endless elastic band 42 preferably formed of a good grade of flat rubber of a thickness at least a little greater than the width of the access slots 40 and 41. The incline of the slots 40 and 41 makes it easier to insert and withdraw the elastic connector band through these access slots. The width of the access slots 40 and 41, being at least slightly less than the normal unstressed thickness of the rubber of which the endless elastic connector band 42 is formed, ordinarily prevents accidental disengagement of the hooks from the band but makes it possible, when a part of the band is thinned by stretching, to readily pass the stretched part of the band through the access slots in engaging the band with or disengaging it from the hook members 35 and 36. The provision of the access slots 40 and 41 and the use of the endless elastic band 42 as a connector member saves in cost of manufacture by eliminating the necessity of vulcanizing two ends of each elastic connector member to the hook members, as shown in FIGS. 1 to 4. Also it makes possible the use of a more durable two ply elastic connector member and one which can be replaced by the user if broken. Positioning the access slots 40 and 41 in the border metal at the innermost ends of the hook members 35 and 36 avoids, to a maximum extent, weakening of said hook members by these access slots.

The hook member 43 shown in FIG. 8 is similar to the hook member 40 shown in FIGS. 5, 6 and 7 except that a narrow diagonal access slot 44 extending from one edge of said hook member 43 to a transverse connector member receiving slot 45 in the inner end portion of said hook member 43 is used instead of the access slot 40 of hook member 35. The diagonal access slot 44 permits attachment and detachment of the endless elastic connector band 42 in substantially the same manner as does the slot 40 of the hook member 35.

FIGS. 9 and 10 show a tool which can, in some instances, be used to facilitate pushing a hook member, such as hook member 25 or 35, through a narrow opening in the rim portion of a wheel or through openings in dual wheels or the rim portions thereof. This tool comprises a thin flat metal bar 46 having two short spaced apart longitudinal cuts 47 extending from one end thereof inwardly to form a medial gripping member 48 and two lateral gripping members 50 and 51. The medial gripping member 48 and the two lateral gripping members 50 are at least slightly resilient and are relatively displaced sidewise in opposite directions far enough so that when they are positioned between the two plies of the elastic band 42 they can be slipped over and will resiliently grip the inner end portion of either the hook member 35 or 43. Thus the said tool will serve as a handle to facilitate insertion of one of the hook members through an opening difficult of access or one which requires the hook to be pushed through it.

For use with some equipment it is desirable to provide the longer hook members with either a longitudinal or a transverse curvature or with both of such curvatures, these curvatures being optional, the longitudinal curvature of the hook member 35 being shown in FIG. 6 and the transverse curvature thereof being shown in FIG. 7. Obviously hook members 25 and 43 may have either or both of these curvatures.

The hooks shown on hook members 35 and 43 of FIGS. 5 to 8 are similar to the hook 30 of FIGS. 3 and 4 and the hook and finger pieces on hook member 36 of FIGS. 5 and 6 are similar to hook 31 and finger pieces 32 and 33 of FIGS. 3 and 4. The normal unstressed lengths of the rubber connector members vary for wheels of different sizes but in all instances these rubber connector members are short enough so that they will be stretched and under tension when they are on a wheel and a tire chain is attached thereto, as shown in FIG. 11 and hereinafter described. This insures that the part of the tire chain with which this device is connected will always be held snugly against the tire and is conducive to more efficient operation of the device in drawing the tire chain around the tire.

FIGS. 11 shows a typical application of the tire chain applying device of FIGS. 5 and 6 to a wheel, which includes a wheel web part 55, rim 56 and tire 57. A large percentage of wheels now in use on automobiles and trucks have narrow openings 58 provided between the periphery of the web part 55 and the rim 56. These openings 58 are freely accessible from the outer sides of the wheels when the usual hub caps are removed from the wheels. One typical method of using our tire chain applying device on wheels without jacking the wheels up is to remove the hub cap, thrust the flat hook member of the device through a conveniently positioned opening 58 far enough so that the other hook member 36 rests against the rim 56, lay a tire chain 60 out in alignment with the wheel and engage the tire chain with the hooks of the device at the location of the ends of one of the terminal cross chains 61 of said tire chain. In so engaging the tire chain it is necessary to stretch the elastic connector member 42 and the tension of said member 42 holds the adjacent cross chain 61 snugly against the tire 57. The vehicle is then moved in a direction away from the tire chain 60 far enough to rotate the wheel approximately one complete revolution in a direction as indicated by arrow A. This will cause the tire chain to be carried up and over and around the wheel and will bring the two ends of said tire chain together at about the location where the chain applying device was first attached. In this position the two ends of the tire chain 60 can easily be secured together by the conventional means provided on said tire chain and the chain applying device can be removed, if desired.

However, the elastic connector member, exemplified by 42 in FIG. 11, is always under tension and stretched when a tire chain is attached to it and it can be left on the wheel, if desired, while the vehicle is being used with the tire chain on the wheel. When thus left on the wheel it will hold the part of the tire chain with which it is connected snugly against the tire but will not tend to pull the tire chain to one side of the tire, as some tire chain tighteners do. It is also advantageous, in instances of tire chains which fit the tire loosely, to use two or even more than two of our tire chain applying devices spaced around the wheel, as chain tighteners.

When used as just hereinbefore described, our chain applying device obviates the necessity of jacking up the wheel thereby saving time and labor and avoiding the danger of accident incident to jacking up a wheel. However our chain applying device is of advantage to use and makes easier the work of applying a tire chain to a wheel that is jacked up and can be rotated manually in getting the tire chain around the tire. Also our tire chain applying device can be used to advantage if the tire chain is laid out on the ground, the wheel is moved onto the tire chain, one end of the tire chain is attached to the wheel by the device and the wheel is further moved on the tire chain until the two ends of the tire chain are close together and can conveniently be secured to each other.

The foregoing description and accompanying drawings clearly illustrate preferred embodiments of our device but it will be understood that these disclosures are merely illustrative and that changes may be made within the scope of the following claims.

We claim:

1. A tire chain applying device comprising a connector member of thin flat pliable elestic material; and two metal hook members connected with the respective end portions of said elastic connector member, one of said hook members being substantially flat throughout its entire area, whereby it can be passed through a narrow opening in the rim portion of a wheel, and terminating at its outer end in a hook which lies in substantially the same place as the outer end portion of said hook member and the other hook member having a plane flat inner end portion and terminating at its outer end in at least one transversely extending curved hook capable of being used as a hand hold and adapted to be engaged with a tire chain.

2. A device for applying tire chains to wheels having narrow slots in their rim portions extending from outside to inside of the wheel, comprising a connector member of thin flat pliable elastic material; and two hook members of flat metal connected with the respective end portions of said flat elastic connector member, one of said hook members being relatively long and of substantially greater length than width and being substantially flat throughout its entire area, whereby it can be passed through a narrow slot in the rim portion of a wheel and terminating at its outer end in a hook which lies in substantially the same plane as the outer end portion of said one hook member, and the other hook member being short and having a plane flat inner end portion and terminating at its outer end in a medially positioned curved hook extending fienerally transversely in one direction and two laterally positioned curved hooks extending generally transversely in the opposite direction from the plane of the flat inner end portion of said other hook member.

3. A tire chain applying device for use on a motor vehicle wheel having web, rim and tire portions and having narrow slots in the web portion adjacent the rim portion extending from outside to inside of the wheel, comprising an endless band type connector member of flat pliable elastic material and of a length at least equal to the width of the wheel rim; an approximately flat hook member of substantially greater length than width having adjacent its inner end a transverse slot adapted to receive said endless elastic connector member, and having adjacent its outer end a relatively wide deep notch extending from one lateral edge thereof inwardly forming a tire chain engaging hook disposed substantially in the plane of the outer end portion of said hook member, said hook member being substantially flat and unobstructed throughout its entire length whereby it can be passed through the narrow slots in the rim portion of the wheel; and a relatively short hook member of flat metal having therein a transverse connector member receiving slot adjacent its inner end adapted to receive said elastic connector member and having at its outer end a medially positioned curved hook extending transversely in one direction and two laterally positioned curved hooks at the respective sides of said medially positioned hook and extending transversely in the opposite direction from the medially positioned hook, the three hooks of said shorter hook member providing hand hold and chain engaging means and being incapable of passing through the narrow slots in said wheel web and the inner end part of each of said hook members between the connector member receiving slot therein and the adjacent end of the hook member having a diagonal access slot of less width than the thickness of the endless elastic connector member extending entirely across it, whereby when a section of the endless elastic connector member is stretched it can be passed through the diagonal access slot in connecting the hook members with and disconnecting said hook members from the endless elastic connector member.

References Cited by the Examiner

UNITED STATES PATENTS

| | | |
|---|---|---|
| 562,114 | 6/96 | Benford. |
| 1,390,761 | 9/21 | Christiansen. |
| 1,426,268 | 8/22 | Flugel _____ 81—15.8 |
| 1,713,360 | 5/29 | Woodling et al. _____ 81—15.8 |
| 2,100,819 | 11/37 | Salley _____ 81—15.8 |
| 2,316,718 | 4/43 | Royer. |
| 2,707,411 | 5/55 | St. Pierre _____ 81—15.8 |

FOREIGN PATENTS 180,498   12/54   Austria.

WILLIAM FELDMAN, *Primary Examiner.*